United States Patent
Daughenbaugh et al.

(10) Patent No.: US 9,150,736 B2
(45) Date of Patent: Oct. 6, 2015

(54) METHODS OF COATING AN ELECTRICALLY CONDUCTIVE SUBSTRATE AND RELATED ELECTRODEPOSITABLE COMPOSITIONS

(71) Applicant: PPG Industries Ohio, Inc., Cleveland, OH (US)

(72) Inventors: Randy E. Daughenbaugh, Monroeville, PA (US); Stuart D. Hellring, Pittsburgh, PA (US); Robin M. Peffer, Valencia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 224 days.

(21) Appl. No.: 13/686,003

(22) Filed: Nov. 27, 2012

(65) Prior Publication Data

US 2014/0144778 A1    May 29, 2014

(51) Int. Cl.
| | | |
|---|---|---|
| C09D 5/44 | (2006.01) | |
| H01M 4/04 | (2006.01) | |
| C09D 7/12 | (2006.01) | |
| C25D 15/02 | (2006.01) | |
| H01M 4/139 | (2010.01) | |
| C25D 13/16 | (2006.01) | |
| C08K 3/04 | (2006.01) | |
| C08K 3/22 | (2006.01) | |
| H01M 4/1397 | (2010.01) | |
| H01M 4/58 | (2010.01) | |

(52) U.S. Cl.
CPC .............. *C09D 5/448* (2013.01); *C09D 7/1216* (2013.01); *C25D 13/16* (2013.01); *C25D 15/02* (2013.01); *H01M 4/0457* (2013.01); *H01M 4/139* (2013.01); *C08K 3/04* (2013.01); *C08K 3/22* (2013.01); *H01M 4/1397* (2013.01); *H01M 4/5825* (2013.01)

(58) Field of Classification Search
CPC ........ C25D 13/16; C25D 15/02; C25D 13/22; C25D 13/04; C09D 7/1216; C09D 5/448; C09D 101/00; C09D 101/08; C09D 101/126; H01M 4/0457; H01M 4/139; H01M 4/1397; H01M 4/5825; H01M 4/405; H01M 4/505; H01M 4/525; C08K 3/04; C08K 3/22
USPC ........................................................ 204/498
See application file for complete search history.

(56) References Cited

U.S. PATENT DOCUMENTS

| | | |
|---|---|---|
| 3,869,366 A | 3/1975 | Suzuki et al. |
| 6,855,273 B2 | 2/2005 | Ravet et al. |
| 7,285,201 B2 | 10/2007 | Emmonds et al. |
| 8,168,058 B2 | 5/2012 | Ho et al. |
| 8,237,538 B2 | 8/2012 | Braun et al. |
| 8,247,116 B2 | 8/2012 | He et al. |
| 2008/0081256 A1 | 4/2008 | Madou et al. |
| 2012/0073971 A1* | 3/2012 | Prieto et al. ................... 204/490 |
| 2013/0341194 A1* | 12/2013 | Fuchsbichler et al. .......... 205/50 |

FOREIGN PATENT DOCUMENTS

| | | |
|---|---|---|
| EP | 2490284 A1 | 8/2012 |
| WO | WO 2009/012899 | 1/2009 |

OTHER PUBLICATIONS

H. Mazor, D. Golodnitsky, L. Burstein, A. Gladkich, E. Peled, "Electrophoretic deposition of lithium iron phosphate cathode for thin-film 3D-microbatteries", Journal of Power Sources 198 (2012) 264-272, Elsevier B.V.

* cited by examiner

*Primary Examiner* — Xiuyu Tai
(74) *Attorney, Agent, or Firm* — William J. Uhl

(57) ABSTRACT

Methods are disclosed in which an electrically conductive substrate is immersed into an electrodepositable composition, the substrate serving as an electrode in an electrical circuit comprising the electrode and a counter-electrode immersed in the composition, a coating being applied onto or over at least a portion of the substrate as electric current is passed between the electrodes. The electrodepositable composition comprises: (a) an aqueous medium; (b) an ionic resin; and (c) solid particles.

10 Claims, No Drawings

METHODS OF COATING AN ELECTRICALLY CONDUCTIVE SUBSTRATE AND RELATED ELECTRODEPOSITABLE COMPOSITIONS

FIELD

The present invention relates to methods of coating an electrically conductive substrate by electrodeposition of a composition having a high weight ratio of solid particles to resin. The present invention is also related to electrodepositable compositions that have a high weight ratio of solid particles to resin in which the solid particles include lithium-containing particles.

BACKGROUND

Electrodeposition as a coating application method involves the deposition onto an electrically conductive substrate of a composition under the influence of an applied electrical potential. A coating is deposited as the substrate is immersed in the composition, the substrate serving as an electrode in an electrical circuit of the electrode and a counter-electrode immersed in the composition, the coating being applied to the substrate as electric current is passed between the electrodes.

Often, the composition used in an electrodeposition process includes a resinous phase dispersed in an aqueous medium. While the composition into which the substrate is immersed may include pigments to provide color and other fillers and additives, the properties historically sought by electrodeposited coatings, such as outstanding corrosion resistance, arise primarily because of the deposition of a continuous resinous film. Therefore, the resin content of the composition into which the substrate is immersed is relatively high in relation to the amount of pigment and other fillers. For example, such compositions usually contain 0.02 to 1 parts by weight pigment to 1 part by weight resinous phase.

Lithium ion batteries consist of a cathode, an anode, a separator, and an electrolyte. The cathode is a metal (often aluminum) foil substrate having a lithium-containing active material, such as $LiFePO_4$, deposited thereon. The lithium-containing active material is deposited on the substrate from a slurry containing the lithium-containing active material, conductive carbon, and binder (such as polyvinylidene difluoride) in organic solvent (such as n-methyl-2-pyrrolidone) via a slot die coater or a roll coater. In these slurries, the sum of the amount of lithium-containing active material and conductive carbon is high relative to the amount of binder, typically at least 9 parts by weight to 1 part by weight. The use of such solvent-borne slurries is, however, environmentally undesirable.

As a result, alternative methods and compositions for depositing lithium-containing compositions on a metal foil are desired. The present invention was made in view of the foregoing.

SUMMARY OF THE INVENTION

In certain respects, the present invention is directed to methods that comprise immersing an electrically conductive substrate into an electrodepositable composition, the substrate serving as an electrode in an electrical circuit comprising the electrode and a counter electrode immersed in the composition, a coating being applied onto or over at least a portion of the substrate as electric current is passed between the electrodes. The electropositable composition used in these methods comprises: (a) an aqueous medium; (b) an ionic resin; and (e) solid particles and has a weight ratio of solid particles to ionic resin of at least 4:1.

In other respects, the present invention is directed to methods that comprise immersing an electrically conductive substrate into an electrodepositable composition, the substrate serving as an electrode in an electrical circuit comprising the electrode and a counter-electrode immersed in the composition, a coating being applied onto or over at least a portion of the substrate as electric current is passed between the electrodes. The electrodepositable compositions used in these methods comprises: (a) an aqueous medium; (b) an ionic resin; and (iii) solid particles comprising lithium-containing particles.

In still other respects, the present invention is directed to electrodepositable compositions comprising: (a) an aqueous medium; (b) an ionic resin; and (c) solid particles comprising: (A) lithium-containing particles, and (B) electrically conductive particles, wherein the composition has a weight ratio of solid particles to ionic resin of at least 4:1.

The present invention is also directed to, among other things, related coated substrates.

DETAILED DESCRIPTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

As indicated, certain embodiments of the present invention are directed to methods that comprise immersing an electrically conductive substrate into an electrodepositable composition. Electrically conductive substrates suitable for use in the methods described herein include metallic substrates as well as electrically conductive composite materials, such as polymeric materials containing a sufficient amount of conductive filler, such as conductive carbon particles, carbon nanotubes, carbon fibers, fullerenes, gaphene and the like. Suitable metallic substrates include, but are not limited to, ferrous and non-ferrous metals. Suitable ferrous metals include iron, steel, and alloys thereof. Non-limiting examples of useful steel materials include cold-rolled steel, galvanized (zinc coated) steel, electrogalvanized steel, stainless steel, pickled steel, GALVANNEAL, GALVALUME, and GALVAN zinc-aluminum alloys coated upon steel, and combinations thereof. Useful non-ferrous metals include aluminum, copper, manganese, nickel, zinc, magnesium, and alloys thereof. Combinations or composites of ferrous and non-ferrous metals can also be used.

In certain embodiments, the substrate is embodied in the form of a sheet, coil, or foil. As used herein, the term "foil" refers to a thin and pliable sheet of metal. Such foils may be constructed of, for example, aluminum, iron, copper, manganese, nickel, combinations thereof, and/or alloys thereof in certain embodiments, the thickness of the foil, such as a foil comprising aluminum, is no more than 8 mils (203.2 μm), such as no more than 4 mils (101.6 μm), no more than 2 mils (50.8 μm), or, in some cases no more than 1 mil (25.4 μm), and/or at least 0.1 mil (2.54 μm), such as at least 0.2 mil (5.08 μm), at least 0.4 mils (10.2 μm), or at least 0.5 mil (12.7 μm).

The methods of the present invention comprise immersing the electrically conductive substrate into an electrodepositable composition, the substrate serving as an electrode in an electrical circuit comprising the electrode and a counter-electrode immersed in the composition, a coating being applied onto or over at least a portion of the substrate as electric current is passed between the electrodes. As used herein, the phrase "onto or over" means that the coating may be applied directly on at least a portion of the substrate surface or the coating may be applied over any coating or pretreatment material which was previously applied to at least a portion of the substrate surface.

As used herein, the term "electrodepositable composition" refers to a composition that includes components that are electrodepositable. As used herein, the term "electrodepositable" means capable of being deposited onto an electrically conductive substrate under the influence of an applied electrical potential.

The electrodepositable compositions used in the methods of the present invention comprise an aqueous medium. As used herein, the term "aqueous medium" refers to a medium that either consists exclusively of water or comprises predominantly water in combination with inert organic cosolvent(s). In certain embodiments, the organic cosolvents are at least partially soluble with water. Examples of such solvents include oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols. Examples of other at least partially water-miscible solvents include alcohols such as ethanol, isopropanol, butanol and diacetone alcohol. If used, the organic cosolvents are, in certain embodiments, used in amounts less than 25 percent by weight, less than 20 percent by weight, or, in some cases, less than 10 percent by weight, such as less than 5 percent by weight, based on total weight of water in the composition.

In certain embodiments, the aqueous medium is present in the composition used in the methods of the present invention in an amount of at least 75 percent by weight, at least 90 percent by weight, or at least 95 percent by weight, such as 75 to 99.5 percent by weight, 90 to 99 percent by weight, or, in some cases, 95 to 99 percent by weight, based on the total weight of the composition. In other words, the compositions used in the methods of the present invention may have a relatively low total solids content, as described further below.

The electrodepositable compositions used in the methods of the present invention comprise an ionic resin. As used herein, the term "ionic resin" refers to any resin that carries a charge, including resins that carry a negatively charged ion and resins that carry a positively charged ion. Suitable ionic resins include, therefore, anionic resins and cationic resins.

In certain embodiments of the present invention, the ionic resin comprises an anionic salt group-containing resin. Suitable anionic resins include resins that contain at least partially neutralized anionic groups, such as acid groups, such as carboxylic acid groups, which impart a negative charge. Non-limiting examples of suitable anionic resins, therefore, include base-neutralized, carboxylic acid group-containing resins.

In certain embodiments, the anionic resin comprises a water soluble anionic resin. As used herein, the term "water soluble resin" means that a resin is capable of being essentially uniformly blended and/or molecularly or ionically dispersed in water to form a true solution. See R. Lewis, Sr., Hawley's Condensed Chemical Dictionary, (12th Ed. 1993) at page 586. In certain embodiments, the water soluble anionic resin comprises a cellulose derivative, such as is the case with carboxymethylcellulose and salts thereof (CMC). CMC is a cellulosic ether in which a portion of the hydroxyl groups on the anhydroglucose rings are substituted with carboxymethyl groups. The degree of carboxymethyl substitution can range from 0.4-3. Since CMC is a long chain polymer, its viscosity in aqueous solutions depends on its molecular weight that can vary between 50,000 and 2,000,000 on a weight average basis. In certain embodiments, the carboxymethylcellulose has a weight average molecular weight of at least 50,000, such as at least 100,000, or some cases, at least 200,000, such as 50,000 to 1,000,000, 100,000 to 500,000, or 200,000 to 300,000. Both the degree of substitution and the viscosity of aqueous solutions can be determined via ASTM D 1439-03. Molecular weight is typically estimated from the viscosity of standard CMC solutions. According to one method, the molecular weight of CMC can be estimated using viscosity by:

$$\eta[Pa \quad S]=8.91\times10^{-4}+1.30\times10^{-5}cM_W^{0.9}+5.33\times10^{-8}c^2M_W^{1.8}+4.60\times10^{-15}c^{4.34}M_W^{3.91}$$

where η is viscosity, c is CMC concentration, $M_W$ is molecular weight, as described by Kulicke in Polymer Vol. 37 No. 13, pp. 2723-2731 1996.

In certain embodiments of the present invention, the water soluble anionic resin, such as a cellulose derivative, such as carboxymethylcellulose, is present in an amount of at least 50 percent by weight, such as at least 60 percent by weight, at least 70 percent by weight, at least 80 percent by weight, or, in some cases, at least 90 percent by weight, based on the total weight of resin solids in the composition. In certain embodiments, the water soluble anionic resin, such as a cellulose derivative, such as carboxymethylcellulose, is present in an amount of no more than 20 percent by weight, no more than 15 percent by weight, no more than 10 percent by weight, no more than 5 percent by weight, such as 1 to 20 percent by weight, 1 to 15 percent by weight, 5 to 15 percent by weight, or, in some eases, 1 to 3 percent by weight, based on the total weight of solids in the composition. As used herein, the term "total weight of solids" refers to the total non-volatile content of the composition, i.e., the content of materials in the composition that will not volatilize when heated and excludes water and organic solvents.

In certain embodiments, in addition to a water soluble anionic resin, the composition may also comprise a water dispersible anionic resin. As used herein, a "water dispersible resin" means a resin that is capable of being distributed throughout water as finely divided particles. See Hawley's at page 435.

Examples of water dispersible anionic resins that are suitable for use in the compositions described herein in combination with a water soluble anionic resin include the reaction product or adduct of a drying oil or semi-drying fatty acid ester with a dicarboxylic acid or anhydride; and the reaction product of a fatty acid ester, unsaturated acid or anhydride and any additional unsaturated modifying materials which are further reacted with polyol. Also suitable are the interpolymers of hydroxy-alkyl esters of unsaturated carboxylic acids, unsaturated carboxylic acid and at least one other ethylenically unsaturated monomer.

Other suitable water dispersible anionic resins are mixtures of alkyd resin and an amine-aldehyde resin, mixed esters of a resinous polyol, and phosphatized polyepoxides or phosphatized acrylic resins, such as those disclosed in EP0469491B1 at page 2, line 56 to page 3, line 56, U.S. Patent Application Publication No. 2009-0045071 at [0004]-[0015] and U.S. patent application Ser. No. 13/232,093 at [0014]-[0040], the cited portions of which being incorporated herein by reference. Also suitable are those resins comprising one or more pendent carbamate functional groups, such as those described in U.S. Pat. No. 6,165,338.

In certain embodiments, the composition comprises an anionic resin composition comprising a water soluble anionic resin, such as a cellulose derivative, such as carboxymethylcellulose, and a water dispersible anionic resin, different from the cellulose derivative, wherein the water dispersible anionic resin is present in the composition in an amount of less than 50 percent by weight, such as less than 40 percent by weight, less than 30 percent by weight, less than 20 percent by weight, or, in some cases, less than 10 percent by weight, based on the total weight of anionic resin in the composition.

As will be appreciated, in adapting an anionic resin to be solubilized or dispersed in an aqueous medium, it is often at least partially neutralized with a base. Suitable bases include both organic and inorganic bases. Illustrative examples of suitable bases are ammonia, monoalkylamines, dialkylamines, or trialkylamines such as ethylamine, propylamine, dimethylamine, dibutylamine and cyclohexylamine; monoalkanolamine, dialkanolamine or trialkanolamine such as ethanolamine, diethanolamine, triethanolamine, propanolamine, isopropanolamine, diisopropanolamine, dimethylethanolamine and diethylethanolamine; morpholine, e.g., N-methylmorpholine or N-ethylmorpholine. Examples of suitable inorganic bases include the hydroxide, carbonate, bicarbonate, and acetate bases of alkali or alkaline metals, specific examples of which include potassium hydroxide, lithium hydroxide, and sodium hydroxide. As a result, in certain embodiments, the composition comprises an alkali salt of a cellulose derivative, such as sodium carboxymethylcellulose, potassium carboxymethylcellulose and/or lithium carboxymethylcellulose. In certain embodiments, the resin(s) are at least partially neutralized from 20 to 200 percent, 40 to 150 percent, such as 60 to 120 percent neutralization.

In certain embodiments, the water dispersible anionic resin described above comprises an active hydrogen-containing, anionic salt group-containing resin and the composition further comprises a curing agent that comprises reactive groups that are reactive with active hydrogen groups. As used herein, the term "active hydrogen-containing, anionic salt group-containing resin" refers to resins that include active hydrogen functional groups and at least partially neutralized anionic groups. As used herein, the term "active hydrogen functional groups" refers to those groups that are reactive with isocyanates as determined by the Zerewitnoff test as is described in the JOURNAL OF THE AMERICAN CHEMICAL SOCIETY, Vol. 49, page 3181 (1927) and include, for example, hydroxyl groups, primary or secondary amine groups, and thiol groups. In certain embodiments, the active hydrogen functional groups are hydroxyl groups, primary amine groups and/or secondary amine groups.

Suitable curing agents for use in electrodepositable compositions comprising an active hydrogen-containing, anionic salt group-containing resin include, but are not necessarily limited to, aminoplast resins and phenolplast resins. Suitable aminoplast resins are condensation products of an aldehyde, e.g., formaldehyde, acetaldehyde, crotonaldehyde, and benzaldehyde and an amino or amido group containing material such as urea, melamine, and benzoguanamine. Products obtained from the reaction of alcohols and formaldehyde with melamine, urea and benzoguanamine are often used. Illustrative but non-limiting examples of useful aminoplast resins are those available under the trademark CYMEL from Cytec Industries and RESIMENE from Solutia Inc. Specific examples are CYMEL 1130 and 1156 and RESIMENE 750 and 753.

In other embodiments of the present invention, the ionic resin comprises an cationic salt group-containing resin. Suitable cationic salt-group containing resins include resins that contain at least partially neutralized cationic groups, such as sulfonium groups and amine groups, which impart a positive charge.

In certain embodiments, the cationic resin comprises a water soluble cationic resin. In certain embodiments, the water soluble cationic resin comprises a poly($C_{2-4}$)-alkyleneimine, which can be linear or branched, specific examples of which include polyethyleneimines (PEIs). As will be appreciated, PEIs are made by a ring opening polymerization of ethyleneamine. Other suitable water soluble cationic resins include poly(allylamine hydrochloride), poly(acrylamide-co-diallyldimethylammonium chloride) and poly(2-methacryloxyethyltrimethylammonium chloride). In certain embodiments, the water soluble cationic resin, such as those mentioned above, has a weight average molecular weight of at least 5,000, such as at least 10,000, or, in some cases, 5,000 to 50,000, or, in some cases 10,000 to 25,000.

In certain embodiments, the water soluble cationic resin, such as a PEI, is present in an amount of at least 50 percent by weight, such as at least 60 percent by weight, at least 70 percent by weight, at least 80 percent by weight, or, in some cases, at least 90 percent by weight, based on the total weight of resin in the composition. In certain embodiments, the water soluble cationic resin, such as a PEI, is present in an amount of no more than 20 percent by weight, no more than 15 percent by weight, no more than 10 percent by weight, no more than 5 percent by weight, such as 1 to 20 percent by weight, 1 to 15 percent by weight, 5 to 15 percent by weight, or, in some cases, 1 to 3 percent by weight, based on the total weight of solids in the composition.

In certain embodiments, in addition to a water soluble cationic resin, the composition also comprises a water dispersible cationic resin. Examples of water dispersible cationic resins that are suitable for use in the compositions described herein are active hydrogen-containing, cationic salt group-containing resins. As used herein, the term "active hydrogen-containing, cationic salt group-containing resin" refers to resins that include active hydrogen functional groups and at least partially neutralized cationic groups. Examples of resins that are suitable for use as the active hydrogen-containing, cationic salt group-containing resin in the present invention include, but are not limited to, alkyd resins, acrylics, polyepoxides, polyamides, polyurethanes, polyureas, polyethers, and polyesters, among others.

More specific examples of suitable active hydrogen-containing, cationic salt group containing resins include polyepoxide-amine adducts, such as the adduct of a polyglycidyl ethers of a polyphenol, such as Bisphenol A, and primary and/or secondary amines, such as are described in U.S. Pat. No. 4,031,050 at col. 3, line 27 to col. 5, line 50, U.S. Pat. No. 4,452,963 at col. 5, line 58 to col. 6, line 66, and U.S. Pat. No. 6,017,432 at col. 2, line 66 to col. 6, line 26, these portions of which being incorporated herein by reference. In certain embodiments, a portion of the amine that is reacted with the polyepoxide is a ketamine of a polyamine, as is described in U.S. Pat. No. 4,104,147 at col. 6, line 23 to col. 7, line 23, the cited portion of which being incorporated herein by reference. Also suitable are ungelled polyepoxide-polyoxyalkylenepolyamine resins, such as are described in U.S. Pat. No. 4,432,850 at col. 2, line 60 to col. 5, line 58, the cited portion of which being incorporated herein by reference. In addition, cationic acrylic resins, such as those described in U.S. Pat. No. 3,455,806 at col. 2, line 18 to col. 3, line 61 and U.S. Pat. No. 3,928,157 at col. 2, line 29 to col. 3, line 21, these portions of both of which being incorporated herein by reference, can be used.

Besides amine salt group-containing resins, quaternary ammonium salt group-containing resins can also be employed as a cationic salt group-containing resin in the compositions described herein. Examples of these resins are those which are formed from reacting an organic polyepoxide with a tertiary amine acid salt. Such resins are described in U.S. Pat. No. 3,962,165 at col. 2, line 3 to col. 11, line 7, U.S. Pat. No. 3,975,346 at col. 1, line 62 to col. 17, line 25, and U.S. Pat. No. 4,001,156 at col. 1, line 37 to col. 16, line 7, these portions of which being incorporated herein by reference. Examples of other suitable cationic resins include ternary sulfonium salt group-containing resins, such as those described in U.S. Pat. No. 3,793,278 at col. 1, line 32 to col. 5, line 20, this portion of which being incorporated herein by reference. Also, cationic resins which cure via a transesterification mechanism, such as described in European Patent Application No. 12463B1 at p. 2, line 1 to p. 6, line 25, this portion of which being incorporated herein by reference, can also be employed.

Other suitable cationic salt group-containing resins include those that may form photodegradation resistant electrodepositable coating compositions. Such resins include the resins comprising cationic amine salt groups which are derived from pendant and/or terminal amino groups that are disclosed in United States Patent Application Publication 2003/0054193 A1 at [0064] to [0088], this portion of which being incorporated herein by reference. Also suitable are the active hydrogen-containing, cationic salt group-containing resins derived from a polyglycidyl ether of a polyhydric phenol that is essentially free of aliphatic carbon atoms to which are bonded more than one aromatic group, which are described in United States Patent Application Publication US 2003/0054193 A1 at [0096] to [0123], this portion of which being incorporated herein by reference.

In certain embodiments, the compositions comprise a cationic resin composition comprising a water soluble cationic resin, such as a PEI, and a water dispersible cationic resin, different from the PEI, wherein the water dispersible cationic resin is present in the composition in an amount of less than 50 percent by weight, such as less than 40 percent by weight, less than 30 percent by weight, less than 20 percent by weight, or, in some cases, less than 10 percent by weight, based on the total weight of cationic resin in the composition.

As will be appreciated, in adapting the cationic resin to be solubilized or dispersed in an aqueous medium, the resin is at least partially neutralized by, for example, treating with an acid. Non-limiting examples of suitable acids are inorganic acids, such as phosphoric acid and sulfamic acid, as well as organic acids, such as, acetic acid and lactic acid, among others. Besides acids, salts such as dimethylhydroxyethylammonium dihydrogenphosphate and ammonium dihydrogenphosphate can be used. In certain embodiments, the cationic resin is neutralized to the extent of at least 50 percent or, in some cases, at least 70 percent, of the total theoretical neutralization equivalent. The step of solubilization or dispersion may be accomplished by combining the neutralized or partially neutralized resin with the water.

In certain embodiments, the composition further includes a curing agent to react with the active hydrogen groups of the cationic salt group containing resin described above. Non-limiting examples of suitable curing agents are polyisocyanates, including at least partially blocked polyisocyanates, aminoplast resins and phenolic resins, such as phenolformaldehyde condensates including allyl ether derivatives thereof.

In certain embodiments, the composition may comprise a catalyst to catalyze the reaction between the curing agent and the active hydrogen-containing resin(s). Suitable cure catalysts include, without limitation, organotin compounds (e.g., dibutyltin oxide and dioctyltin oxide) and salts thereof (e.g., dibutyltin diacetate); other metal oxides (e.g., oxides of cerium, zirconium and bismuth) and salts thereof (e.g., bismuth sulfamate and bismuth lactate). In certain embodiments, the cure catalyst comprises a cyclic guanidine as described in U.S. Pat. No. 7,842,762 at col. 1, line 53 to col. 4, line 18 and col. 16, line 62 to col. 19, line 8, the cited portions of which being incorporated herein by reference. In some embodiments, the compositions do not include an organotin compound.

The compositions used in the methods of the present invention further comprise solid particles. As used herein, the term "solid particles" refers to discrete three dimensional shaped solids which are Chemically different from the ionic resin(s). The shape (or morphology) of the particles can vary. For example, generally spherical morphologies (such as solid beads, microbeads, or hollow spheres), can be used, as well as particles that are cubic, platy, or acicular (elongated or fibrous). Additionally, the particles can have an internal structure that is hollow, porous or void free, or a combination of any of the foregoing, e.g., a hollow center with porous or solid walls. For more information on suitable particle characteristics see H. Katz et al. (Ed.), Handbook of Fillers and Plastics (1987) at pages 9-10.

The solid particles can be polymeric and/or non-polymeric inorganic materials, polymeric and/or non-polymeric organic materials, composite materials, as well as mixtures of any of the foregoing. As used herein, the term "polymer" is meant to encompass oligomers, and includes without limitation both homopolymers and copolymers, As used herein, the term "polymeric inorganic material" means a polymeric material having a backbone repeat unit based on an element or elements other than carbon. Moreover, as used herein, the term "polymeric organic materials" means synthetic polymeric materials, semi-synthetic polymeric materials and natural polymeric materials, all of which have a backbone repeat unit based on carbon.

The term "organic material," as used herein, means carbon containing compounds wherein the carbon is typically bonded to itself and to hydrogen, and often to other elements as well, and excludes binary compounds such as the carbon oxides, the carbides, carbon disulfide, etc.; such ternary compounds as the metallic cyanides, metallic carbonyls, phosgene, carbonyl sulfide, etc.; and carbon-containing ionic compounds such as metallic carbonates, for example calcium carbonate and sodium carbonate. As used herein, the term "inorganic material" means any material that is not an organic material.

As used herein, the term "composite material" means a combination of two or more differing materials. The particles formed from composite materials may have a hardness at their surface that is different from the hardness of the internal portions of the particle beneath its surface. More specifically, the surface of the particle can be modified in any manner well known in the art, including, but not limited to, chemically or physically changing its surface characteristics using techniques known in the art.

For example, a particle can be formed from a primary material that is coated, clad or encapsulated with one or more secondary materials to form a composite particle that has a softer surface. In certain embodiments, particles formed from composite materials can be formed from a primary material that is coated, clad or encapsulated with a different form of the primary material.

As indicated, the solid particles can include any of a variety of inorganic materials, such as ceramic materials, metallic materials, and mixtures of any of the foregoing. Non-limiting examples of such ceramic materials can comprise metal oxides, mixed metal oxides, metal nitrides, metal carbides, metal sulfides, metal silicates, metal borides, metal carbonates, and mixtures of any of the foregoing. A specific, non-limiting example of a metal nitride is boron nitride; a specific, non-limiting example of a metal oxide is zinc oxide; non-limiting examples of suitable mixed metal oxides are aluminum silicates and magnesium silicates; non-limiting examples of suitable metal sulfides are molybdenum disulfide, tantalum disulfide, tungsten disulfide, and zinc sulfide; non-limiting examples of metal silicates are aluminum silicates and magnesium silicates, such as vermiculite.

In certain embodiments of the present invention, the solid particles comprise inorganic materials selected from aluminum, barium, bismuth, boron, cadmium, calcium, cerium, cobalt, copper, iron, lanthanum, magnesium, manganese, molybdenum, phosphorus, selenium, silicon, silver, sulfur, tin, titanium, tungsten, vanadium, yttrium, zinc, and zirconium, including oxides thereof, nitrides thereof, phosphides thereof; phosphates thereof, selenides thereof; sulfides thereof; sulfates thereof; and mixtures thereof. Suitable non-limiting examples of the foregoing inorganic particles include alumina, silica, titania, cera, zirconia, bismuth oxide, magnesium oxide, iron oxide, aluminum silicate, boron carbide, nitrogen doped titania, and cadmium selenide.

In certain embodiments, the solid particles used in the present invention have a lamellar structure. Particles having a lamellar structure are composed of sheets or plates of atoms or particles in a hexagonal array. A non-limiting example of a lamellar structure is a hexagonal crystal structure. Inorganic solid particles having a lamellar fullerene buckyball) structure are also useful.

Non-limiting examples of suitable materials having a lamellar structure include boron nitride, graphite, metal dichalcogenides, mica, talc, gypsum, kaolinite, calcite, cadmium iodide, silver sulfide and mixtures thereof. Suitable metal dichalcogenides include molybdenum disulfide, molybdenum disclenide, tantalum disulfide, tantalum diselenide, tungsten disulfide, tungsten diselenide and mixtures thereof.

The solid particles can be formed from non-polymeric, organic material Non-limiting examples of non-polymeric, organic materials useful in the present invention include, but are not limited to, stearates (such as zinc stearate and aluminum stearate), diamond, carbon black and stearamide.

In certain embodiments, the solid particles comprise an organic pigment, such as for example, azo compounds (monoazo, di-azo, β-Naphthol, Naphthol AS, azo pigment lakes, benzimidazolone, di-azo condensation, metal complex, isoindolinone, isoindoline), and polycyclic (phthalocyaninc, quinacridone, perylene, perinone, diketopyrrolo pyrrole, thioindigo, anthraquinone, indanthrone, anthrapyrimidine, flavanthrone, pyranthrone, anthanthrone, dioxazine, triarylcarbonium, quinophthalone) pigments, and mixtures of any of the foregoing.

In certain embodiments, the solid particles have an average particle size of less than 100 microns prior to incorporation into the composition, such as less than 50 microns prior to incorporation into the composition. In certain embodiments, the solid particles have an average particle size ranging from 1 to 10,000 nanometers prior to incorporation into the composition, 1 to 1000 nanometers prior to incorporation into the composition, or 1 to 100 nanometers prior to incorporation into the composition.

In those embodiments where the average particle size of the solid particles is at least about one micron, the average particle size can be measured according to known laser scattering techniques. For example the average particle size of such particles can be measured using a Horiba Model LA 900 laser diffraction particle size instrument, which uses a helium-neon laser with a wave length of 633 nm to measure the size of the particles and assumes the particle has a spherical shape, i.e., the "particle size" refers to the smallest sphere that will completely enclose the particle.

In those embodiments where the average particle size of the solid particles is less than or equal to one micron, the average particle size can be determined by visually examining an electron micrograph of a transmission electron microscopy ("TEM") image, measuring the diameter of the particles in the image, and calculating the average particle size based on the magnification of the TEM image. One of ordinary skill in the art will understand how to prepare such a TEM image. The diameter of the particle refers to the smallest diameter sphere that will completely enclose the particle.

In certain embodiments of the present invention, the solid particles comprise lithium-containing particles, such as, for example, $LiCoO_2$, $LiNiO_2$, $LiFePO_4$, $LiCoPO_4$, $LiMnO_2$, $LiMn_2O_4$, $Li(NiMnCo)O_2$, and/or $Li(NiCoAl)O_2$. In certain embodiments, such lithium-containing particles have an average particle size, prior to incorporation into the composition, of no more than 10 micron, no more than 5 micron, no more than 3 micron, no more than 1 micron, such as 10 nanometers to 1,000 nanometers, or, in some eases 500 nanometers to 1,000 nanometers or 600 nanometers to 800 nanometers, In certain embodiments, such lithium-containing solid particles are present in an amount of at least 50 percent by weight, at least 60 percent by weight, at least 70 percent by weight, at least 80 percent by weight, such as at least 85 percent by weight, or, in some cases, at least 90 percent by weight, based on the total weight of solids in the composition.

In certain embodiments, including those embodiments mentioned above in which the solid particles comprise the lithium containing particles, the composition comprises electrically conductive particles, such as electrically conductive carbon particles. Suitable electrically conductive particles include electrically conductive carbon blacks, carbon nano tubes, graphenes, carbon fibers, fullerenes and the like. Examples of commercially available electrically conductive carbon blacks, that are suitable for use herein, include, but are not limited to, Cabot Monarch™ 1300, Cabot XC-72R, Black Pearls 2000 and Vulcan XC 72 sold by Cabot Corporation; Acheson Electrodag™ 230 sold by Acheson Colloids Co.; Columbian Raven™ 3500 sold by Columbian Carbon Co.; and Printex™ XE 2, Printex 200, Printex L and Printex L6 sold by DeGussa Corporation, Pigments Group, and Super P® and Super P® Li, C-Nergy™ Super C45 and C-Nergy™ Super C65 sold by TIMCAL Ltd. In certain embodiments, the electrically conductive carbon black used in the compositions described herein has an average particle size, prior to incorporation into the composition, of less than 300 nanometers, such as 1 to 200 nanometers, 10 to 100 nanometers, or, in some cases, 30 to 50 nanometers.

Other electrically conductive particles that are suitable for use in the present invention include, but are not limited to, electrically conductive silica, such as AEROSIL 200 sold by Japan Aerosil Co., Ltd., and SYLOID® 161, SYLOID® 244, SYLOID® 308, SYLOID® 404 and SYLOID® 978 all available from Fuji Davison Co., Ltd., metal powders, such as aluminum, copper or special steel, molybdenum disulphide, iron oxide, e.g., black iron oxide, antimony-doped titanium dioxide and nickel doped titanium dioxide. Also suitable are particles coated with metals such as cobalt, copper, nickel, iron, tin, zinc, and combinations of thereof. Suitable particles which can be coated with the aforementioned metals include alumina, aluminum, aromatic polyester, boron nitride, chromium, graphite, iron, molydenum, neodymium/iron/boron, samarium cobalt, silicon carbide, stainless steel, titanium diboride, tungsten, tungsten carbide, and zirconia particles. Such metal-coated particles are commercially available from Advanced Ceramics Corp. Other metal-coated particles which may be used include ceramic microballoons, chopped glass fibers, graphite powder and flake, boron nitride, mica flake, copper powder and flake, nickel powder and flake, aluminum coated with metals such as carbon, copper, nickel, palladitun, silicon, silver and titanium coatings. These particles are typically metal-coated using fluidized bed chemical vacuum deposition techniques. Such metal-coated particles are commercially available from Powdermet, Inc. Mixtures of different electrically conductive particles can be used.

In certain embodiments, the electrically conductive particles are present in the composition in an amount such that the relative weight ratio of lithium-containing particles to electrically conductive particles in the composition is at least 3:1, at least 4:1, at least 5:1, at least 8:1, at least 10:1, or, in some cases, at least 15:1. In certain embodiments, such electrically conductive particles are present in an amount of no more than 20 percent by weight, no more than 10 percent by weight, such as 1 to 10 percent by weight, or 1 to 5 percent by weight, based on the total weight of the solids in the composition.

In certain embodiments, the composition may include other typical ingredients, such as corrosion inhibitors, anti-oxidants, flow control agents, surfactants and the like.

The compositions described above can be prepared in any desired manner, including the methods described in the Examples. For example, in some embodiments, it may be desirable to incorporate the solid particles by means of a composition in which the solid particles are mixed with a water soluble ionic resin that has been pre-solubilized in an aqueous medium. Exemplary ionic resins suitable for this purpose include the water soluble resins mentioned above. The solids content of such a composition may be relatively high, such as 2 times, 3 times, or 4 times or more the total solids content of the composition in the methods of the present invention. The composition may be mixed, such as by sonification, to provide a uniform dispersion. This sonication may take 15 to 30 minutes or more. The resulting composition may then subsequently be combined with further liquid carrier, i.e., water and optionally organic solvent, to provide the final composition for use in the methods of the present invention.

In certain embodiments of the methods of the present invention, the substrate is immersed in a composition that has a weight ratio of solid particles to ionic resin of at least 4:1, such as at least 5:1, at least 6:1, at least 7:1, at least 8:1, at least 9:1, at least 10:1, at least 11:1, at least 12:1, at least 13:1, at least 14:1, at least 15:1, at least 16:1, at least 17:1, or higher. Moreover, in certain embodiments of the methods of the present invention, the substrate is immersed in a composition that has a total solids content of 0.5 to 25 percent by weight, such as 1 to 10 percent by weight, or, in some cases, 1 to 5 percent by weight, based on the total weight of the composition. Indeed, it has been discovered that such compositions can be provide stable dispersions of the solid particles and ionic resin in an aqueous medium, even without the use of a thickener. As used herein, the term "stable dispersion" refers to a dispersion that does not gel, flocculate or precipitate when maintained at a temperature of 25° C. for at least 60 days, or, if some precipitation does occur, the precipitate can be redispersed upon agitation.

Moreover, it has been discovered that when such compositions are used in the methods of the present invention, even when the weight ratio of solid particles (such as lithium-containing particles in combination with electrically conductive particles, such as electrically conductive carbon particles) to ionic resin in the bath is within the foregoing ranges, a solid uniform coating of a suitable film thickness and acceptable porosity can be provided, which may make the foregoing methods particularly suitable for manufacturing coated substrates that may be used as a cathode for a lithium ion battery.

In the methods of the present invention, a coating is applied onto or over at least a portion of the substrate via an electrodeposition process. In such a process, an electrically conductive substrate (such as any of those described earlier) serving as an electrode (such as an anode in anionic electrodeposition) in an electrical circuit comprising the electrode and a counter-electrode (such as a cathode in anionic electrodeposition), is immersed a composition of the type described above. An electric current is passed between the electrodes to cause the coating to deposit on the substrate. The applied voltage may be varied and can be, for example, as low as one volt to as high as several thousand volts, but is often between 50 and 500 volts. The current density is often between 0.5 ampere and 15 amperes per square foot. In certain embodiments, the residence time of the substrate in the composition is from 30 to 180 seconds.

After electrocoating, the substrate is removed from the bath and may, in certain embodiments and depending upon the particulars of the composition and the preferences of the end user, be baked in an oven. For example, the coated substrate may be baked at temperatures of 225° F. or lower, such as 200° F. or lower for 10 to 60 minutes. In other cases, after electrocoating and removal of the substrate from the bath (and again depending upon the particulars of the bath composition and the preferences of the end user), the coated substrate may simply be allowed to dry under ambient conditions. As used herein, "ambient conditions" refers to atmospheric air having a relative humidity of 10 to 100 percent and a temperature in the range of −10 to 120° C., such as 5 to 80° C., in some cases 10 to 60° C. and, in yet other cases, 15 to 40° C.

As will be appreciated from the foregoing description, in some respects, the present invention is directed to methods comprising: immersing an electrically conductive substrate into an electrodepositable composition, the substrate serving as an electrode in an electrical circuit comprising the electrode and a counter-electrode immersed in the composition, a coating being applied onto or over at least a portion of the substrate as electric current is passed between the electrodes, the electrodepositable composition comprising: (a) an aqueous medium; (b) an ionic resin; and (c) solid particles, wherein the composition has a weight ratio of solid particles to ionic resin of at least 4:1. The present invention is also directed to any method set forth in this paragraph, wherein the substrate is a foil comprising aluminum, iron, copper, manganese, nickel, a combination thereof, and/or an alloy thereof, wherein any of these foils may have a thickness of no more than 8 mils (203.2 µm), such as no more than 4 mils (101.6 µm), no more than 2 mils (50.8 µm), or, in some cases no more than 1 mil (25.4 µm), and/or at least 0.1 mil (2.54 µm), such as at least 0.2 mil (5.08 µm), at least 0.4 mils (10.2 µm), or at least 0.5 mil (12.7 µm). The present invention is also directed to any method set forth in this paragraph, wherein the aqueous medium either consists exclusively of water or comprises predominantly water in combination with inert organic cosolvent(s), such as organic cosolvents that are at least partially soluble with water, such as oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols and alcohols, such as ethanol, isopropanol, butanol and diacetone alcohol. The present invention is also directed to any method set forth in this paragraph, wherein an organic cosolvent is present in an amount of less than 25 percent by weight, less than 20 percent by weight, or, in some cases, less than 10 percent by weight, such as less than 5 percent by weight, based on total weight of water in the electrodepositable composition. The present invention is also directed to any method set forth in this paragraph, wherein the aqueous medium is present in the electrodepositable composition in an amount of at least 75 percent by weight, at least 90 percent by weight, or at least 95 percent by weight, such as 75 to 99.5 percent by weight, 90 to 99 percent by weight, or, in some cases, 95 to 99 percent by weight, based on the total weight of the composition. The present invention is also directed to any method set forth in this paragraph, wherein the ionic resin comprises an anionic resin, such as a base-neutralized, carboxylic acid group-containing resin, such as where the base-neutralized, carboxylic acid group-containing resin is water soluble, such as where the water soluble resin comprises a cellulose derivative, such as an alkali salt of a carboxymethylcellulose, such as a carboxymethylcellulose having a weight average molecular weight of at least 50,000, at least 100,000, at least 200,000, such as 50,000 to 1,000,000, 100,000 to 500,000 or 200,000 to 300,000. The present invention is also directed to any method set forth in this paragraph, wherein a water soluble resin is present in the composition in an amount of at least 50 percent by weight, such as at least 60 percent by weight, at least 70 percent by weight, at least 80 percent by weight, or at least 90 percent by weight, the weight percent being based on the total weight of resin in the composition. The present invention is also directed to any method set forth in this paragraph, wherein a water soluble resin is present in the composition in an amount of no more than 20 percent by weight, such as no more than 15 percent by weight, no more than 10 percent by weight, no more than 5 percent by weight, such as 1 to 20 percent by weight, 1 to 15 percent by weight, 5 to 15 percent by weight, or 1 to 3 percent by weight, the weight percent being based on the total weight of solids in the composition. The present invention is also directed to any method set forth in this paragraph, wherein the solid particles comprise lithium-containing particles, such as lithium-containing particles comprising $LiCoO_2$, $LiMO_2$, $LiFePO_4$, $LiCoPO_4$, $LiMnO_2$, $LiMn_2O_4$, $Li(NiMnCo)O_2$, and/or $Li(NiCoAl)O_2$. The present invention is also directed to any method set forth in this paragraph, wherein lithium-containing particles are present in an amount of at least 50 percent by weight, at least 60 percent by weight, at least 70 percent by weight, at least 80 percent by weight, at least 85 percent by weight, or at least 90 percent by weight, based on the total weight of the solids in the composition. The present invention is also directed to any method set forth in this paragraph, wherein the solid particles comprise electrically conductive particles, such as electrically conductive carbon particles, such as electrically conductive carbon black. The present invention is also directed to any method set forth in this paragraph, wherein a relative weight ratio of lithium-containing particles to electrically conductive particles in the composition is at least 3:1, at least 4:1, at least 5:1, at least 8:1, at least 10:1, or at least 15:1. The present invention is also directed to any method set forth in this paragraph, wherein electrically conductive particles are present in an amount of no more than 20 percent by weight, no more than 10 percent by weight, such as 1 to 10 percent by weight or 1 to 5 percent by weight, based on the total weight of the solids in the composition. The present invention is also directed to any method set forth in this paragraph, wherein the electrodepositable composition has a weight ratio of solid particles to ionic resin of at least 5:1, at least 6:1, at least 7:1, at least 8:1, at least 9:1, at least 10:1, at least 11:1, at least 12:1, at least 13:1, at least 14:1, at least 15:1, at least 16:1, or at least 17:1. The present invention is also directed to any method set forth in this paragraph, wherein the electrodepositable composition has a total solids content of 0.5 to 25 percent by weight, such as 1 to 10 percent by weight, such as 1 to 5 percent by weight, based on the total weight of the composition.

As will be appreciated from the foregoing description, in some respects, the present invention is also directed to methods of making a coated substrate that may, for example, be suitable for use as a positive electrode in a lithium-ion battery. These methods comprise immersing an electrically conductive substrate into an electrodepositable composition, the substrate serving as an electrode in an electrical circuit comprising the electrode and a counter electrode immersed in the composition, a coating being applied onto or over at least a portion of the substrate as electric current is passed between the electrodes. The electrodepositable compositions used in these methods comprises: (a) an aqueous medium; (b) an ionic resin; and (iii) solid particles comprising lithium-containing particles. The present invention is also directed to any method set forth in this paragraph, wherein the composition has a weight ratio of solid particles to ionic resin of at least 4:1, at least 5:1, at least 6:1, at least 7:1, at least 8:1, at least 9:1, at least 10:1, at least 11:1, at least 12:1, at least 13:1, at least 14:1, at least 15:1, at least 16:1, or at least 17:1. The present invention is also directed to any method set forth in this paragraph, wherein the substrate is a foil comprising aluminum, iron, copper, manganese, nickel, a combination thereof, and/or an alloy thereof, wherein any of these foils may have a thickness of no more than 8 mils (203.2 μm), such as no more than 4 mils (101.6 μm), no more than 2 mils (50.8 μm), or, in some cases no more than 1 mil (25.4 μm), and/or at least 0.1 mil (2.54 μm), such as at least 0.2 mil (5.08 μm), at least 0.4 mils (10.2 μm), or at least 0.5 mil (12.7 μm). The present invention is also directed to any method set forth in this paragraph, wherein the aqueous medium either consists exclusively of water or comprises predominantly water in combination with inert organic cosolvent(s), such as organic cosolvents that are at least partially soluble with water, such as oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols and alcohols, such as ethanol, isopropanol, butanol and diacetone alcohol. The present invention is also directed to any method set forth in this paragraph, wherein an organic cosolvent is present in an amount of less than 25 percent by weight, less than 20 percent by weight, or, in some cases, less than 10 percent by weight, such as less than 5 percent by weight, based on total weight of water in the electrodepositable composition. The present invention is also directed to any method set forth in this paragraph, wherein the aqueous medium is present in the electrodepositable composition in an amount of at least 75 percent by weight, at least 90 percent by weight, or at least 95 percent by weight, such as 75 to 99.5 percent by weight, 90 to 99 percent by weight, or, in some cases, 95 to 99 percent by weight, based on the total weight of the composition. The present invention is also directed to any method set forth in this paragraph, wherein the ionic resin comprises an anionic resin, such as a base-neutralized, carboxylic acid group-containing resin, such as where the base-neutralized, carboxylic acid group-containing resin, is water soluble, such as Where the water soluble resin comprises a cellulose derivative, such as an alkali salt of a carboxymethylcellulose, such as a carboxymethylcellulose having a weight average molecular weight of at least 50,000, at least 100,000, at least 200,000, such as 50,000 to 1,000,000, 100,000 to 500,000 or 200,000 to 300,000. The present invention is also directed to any method set forth in this paragraph, wherein a water soluble resin is present in the composition in an amount of at least 50 percent by weight, such as at least 60 percent by weight, at least 70 percent by weight, at least 80 percent by weight, or at least 90 percent by weight, the weight percent being based on the total weight of resin in the composition. The present invention is also directed to any method set forth in this paragraph, wherein a water soluble resin is present in the composition in an amount of no more than 20 percent by weight, such as no more than 15 percent by weight, no more than 10 percent by weight, no more than 5 percent by weight, such as 1 to 20 percent by weight, 1 to 15 percent by weight, 5 to 15 percent by weight, or 1 to 3 percent by weight, the weight percent being based on the total weight of solids in the composition. The present invention is also directed to any method set forth in this paragraph, wherein the lithium-containing particles comprise $LiCoO_2$, $LiNiO_2$, $LiFePO_4$, $LiCoPO_4$, $LiMnO_2$, $LiMn_2O_4$, $Li(NiMnCo)O_2$, and/or $Li(NiCoAl)O_2$. The present invention is also directed to any method set forth in this paragraph, wherein lithium-containing particles are present in an amount of at least 50 percent by weight, at least 60 percent by weight, at least 70 percent by weight, at least 80 percent by weight, at least 85 percent by weight, or at least 90 percent by weight, based on the total weight of the solids in the composition. The present invention is also directed to any method set forth in this paragraph, wherein the solid particles also comprise electrically conductive particles, such as electrically conductive carbon particles, such as electrically conductive carbon black. The present invention is also directed to any method set forth in this paragraph, wherein a relative weight ratio of lithium-containing particles to electrically conductive particles in the composition is at least 3:1, at least 4:1, at least 5:1, at least 8:1, at least 10:1, or at least 15:1. The present invention is also directed to any method set forth in this paragraph, wherein electrically conductive particles are present in an amount of no more than 20 percent by weight, no more than 10 percent by weight, such as 1 to 10 percent by weight or 1 to 5 percent by weight, based on the total weight of the solids in the composition. The present invention is also directed to any method set forth in this paragraph, wherein the electrodepositable composition has a total solids content of 0.5 to 25 percent by weight, such as to 10 percent by weight, such as 1 to 5 percent by weight, based on the total weight of the composition.

As will also be appreciated by the foregoing description, in some respects, the present invention is also directed to electrodepositable compositions comprising: (a) an aqueous medium; (b) an ionic resin; and (c) solid particles comprising: (i) lithium-containing particles, and (ii) electrically conductive particles, wherein the composition has a weight ratio of solid particles to ionic resin of at least 4:1. The present invention is also directed to any electrodepositable composition set forth in this paragraph, wherein the composition has a weight ratio of solid particles to ionic resin of at least 4:1, at least 5:1, at least 6:1, at least 7:1, at least 8:1, at least 9:1, at least 10:1, at least 11:1, at least 12:1, at least 13:1, at least 14:1, at least 15:1, at least 16:1, or at least 17:1. The present invention is also directed to any electrodepositable composition set forth in this paragraph, wherein the aqueous medium either consists exclusively of water or comprises predominantly water in combination with inert organic cosolvent(s), such as organic cosolvents that are at least partially soluble with water, such as oxygenated organic solvents, such as monoalkyl ethers of ethylene glycol, diethylene glycol, propylene glycol, and dipropylene glycol which contain from 1 to 10 carbon atoms in the alkyl group, such as the monoethyl and monobutyl ethers of these glycols and alcohols, such as ethanol, isopropanol, butanol and diacetone alcohol. The present invention is also directed to any electrodepositable composition set forth in this paragraph, wherein an organic cosolvent is present in an amount of less than 25 percent by weight, less than 20 percent by weight, or, in some cases, less than 10 percent by weight, such as less than 5 percent by weight, based on total weight of water in the electrodepositable composition. The present invention is also directed to any electrodepositable composition set forth in this paragraph, wherein the aqueous medium is present in the electrodepositable composition in an amount of at least 75 percent by weight, at least 90 percent by weight, or at least 95 percent by weight, such as 75 to 99.5 percent by weight, 90 to 99 percent by weight, or, in some cases, 95 to 99 percent by weight, based on the total weight of the composition. The present invention is also directed to any electrodepositable composition set forth in this paragraph, wherein the ionic resin comprises an anionic resin, such as a base-neutralized, carboxylic acid group-containing resin, such as where the base-neutralized, carboxylic acid group-containing resin is water soluble, such as where the water soluble resin comprises a cellulose derivative, such as an alkali salt of a carboxymethylcellulose, such as a carboxymethylcellulose having a weight average molecular weight of at least 50,000, at least 100,000, at least 200,000, such as 50,000 to 1,000,000, 100,000 to 500,000 or 200,000 to 300,000. The present invention is also directed to any electrodepositable composition set forth in this paragraph, wherein a water soluble resin is present in the composition in an amount of at least 50 percent by weight, such as at least 60 percent by weight, at least 70 percent by weight, at least 80 percent by weight, or at least 90 percent by weight, the weight percent being based on the total weight of resin in the composition. The present invention is also directed to any electrodepositable composition set forth in this paragraph, wherein a water soluble resin is present in the composition in an amount of no more than 20 percent by weight, such as no more than 15 percent by weight, no more than 10 percent by weight, no more than 5 percent by weight, such as 1 to 20 percent by weight., 1 to 15 percent by weight, 5 to 15 percent by weight, or 1 to 3 percent by weight, the weight percent being based on the total weight of solids in the composition. The present invention is also directed to any electrodepositable composition set forth in this paragraph, wherein the lithium-containing particles comprise $LiCoO_2$, $LiNiO_2$, $LiFePO_4$, $LiCoPO_4$, $LiMnO_2$, $LiMn_2O_4$, $Li(NiMnCo)O_2$, and/or $Li(NiCoAl)O_2$. The present invention is also directed to any electrodepositable composition set forth in this paragraph, wherein lithium-containing particles are present in an amount of at least 50 percent by weight, at least 60 percent by weight, at least 70 percent by weight, at least 80 percent by weight, at least 85 percent by weight, or at least 90 percent by weight, based on the total weight of the solids in the composition. The present invention is also directed to any electrodepositable composition set forth in this paragraph, wherein the electrically conductive particles comprise electrically conductive carbon black. The present invention is also directed to any electrodepositable composition set forth in this paragraph, wherein a relative weight ratio of lithium-containing particles to electrically conductive particles in the composition is at least 3:1, at least 4:1, at least 5:1, at least 8:1, at least 10:1, or at least 15:1. The present invention is also directed to any electrodepositable composition set forth in this paragraph, wherein electrically conductive particles are present in an amount of no more than 20 percent by weight, no more than 10 percent by weight, such as 1 to 10 percent by weight or 1 to 5 percent by weight, based on the total weight of the solids in the composition. The present invention is also directed to any electrodepositable composition set forth in this paragraph, wherein the electrodepositable composition has a total solids content of 0.5 to 25 percent by weight, such as 1 to 10 percent by weight, such as 1 to 5 percent by weight, based on the total weight of the composition.

Illustrating the invention are the following examples, which, however, are not to be considered as limiting the invention to their details.

EXAMPLES

Example 1

0.2 g of sodium carboxymethylcellulose ("SCMC" commercially available from Sigma-Aldrich Co. LLC) was dissolved in 180 g deionized water. According to the certificate of analysis from the supplier, this material had a degree of substitution of 0.86, and a viscosity of 470 cps was measured using a 2 weight percent solution of CMC in water. According to the product data sheet from the supplier, viscosity was measured with a Brookfield model LVF viscometer using the following parameters:

Spindle: #3; Speed: 60 rpm; Temperature: 25° C.; Container: 120 ml polybottle;

Multiplication factor: 20.

The calculated shear rate from these parameters is 12.6 $sec^{-1}$. Assuming viscosity is measured by the supplier with no shear thinning, a viscosity of 470 cps at 2 weight percent concentration estimates a calculated molecular weight of 267,500 using the equation above.

Then, 1 gram of conductive carbon ("C", C-Nergy™ Super C65 commercially available from Timcal Ltd.) was added and then the mixture was sonicated for 25 minutes. Next, 18.8 g of $LiFePO_4$ ("LFP", Life Power® P2 commercially available from Phostech Lithium Inc.) was added in 4 equivalent portions with each addition followed by 5 minutes of sonication. Finally, an additional 10 minutes of sonication was performed to ensure a uniform dispersion. This was then diluted with 600 g deionized water to prepare a 2.5% solids electrodeposition bath with a weight ratio of solid particles (C+LFP) to ionic resin (SCMC) of 99. To perform coating by electrodeposition, an aluminum foil was wired as an electrode and placed in the stirring 90° F. bath containing a thermocouple and a heating/cooling coil that also acted as the counter electrode, and then the voltage was turned on to 150 volts with a current setting of 1.5 amps. The voltage was turned off after 180 seconds and the coated sample was then removed from the bath and allowed to air dry. Results are in Table 1.

Example 2

A coating was prepared according to the same procedure as Example 1, except 0.4 g of sodium carboxymethylcellulose was first dissolved in deionized water and then 1.2 g of conductive carbon and 18.4 g of $LiFePO_4$ were dispersed by sonication to prepare an electrodeposition bath with a weight ratio of solid particles (C+LFP) to ionic resin (SCMC) 49. Results are in table 1.

Example 3

A coating was prepared according to the same procedure as Example 1, except 0.4 g of sodium carboxymethylcellulose was first dissolved in deionized water and then 1.6 g of conductive carbon and 18 g of $LiFePO_4$ were dispersed by sonication to prepare an electrodeposition bath with a weight ratio of solid particles (C+LFP) to ionic resin (SCMC) of 49. Results are in Table 1.

Example 4

A coating was prepared according to the same procedure as Example 1, except 0.5 g of sodium carboxymethylcellulose was first dissolved in deionized water and then 2 g of conductive carbon and 17.5 g of $LiFePO_4$ were dispersed by sonication to prepare an electrodeposition bath with a weight ratio of solid particles (C+LFP) to ionic resin (SCMC) of 39. Results are in Table 1.

Example 5

A coating was prepared according to the same procedure as Example 1, except 0.6 g of sodium carboxymethylcellulose was first dissolved in deionized water and then 2.4 g of conductive carbon and 17 g of $LiFePO_4$ were dispersed by sonication to prepare an electrodeposition bath with a weight ratio of solid particles (C+LFP) to ionic resin (SCMC) of 32. Results are in Table 1.

Example 6

A coating was prepared according to the same procedure as Example 1, with the exceptions that the electrodeposition was only performed for 90 seconds and that 1.05 g of sodium carboxymethylcellulose was first dissolved in deionized water and then 4.2 g of conductive carbon and 14.75 g of $LiFePO_4$ were dispersed by sonication to prepare an electrodeposition bath with a weight ratio of solid particles (C+LFP) to ionic resin (SCMC) of 18. After drying overnight, the resistivity of the coating surfaces was measured using a Monroe Electronics resistivity meter model 291, simply by placing the meter on the coating, pressing the test button and reading the digital display. Results are in Table 1.

TABLE 1

| Example | LFP/C/SCMC Weight Ratio | Weight Ratio (C + LFP/ SCMC) | Coating thickness (μ) | Coating appearance | Coating Surface Resistivity (Ω/□) |
|---|---|---|---|---|---|
| 1 | 94/5/1 | 99 | 54 | Solid uniform coating with slight surface roughness | 10,000 |
| 2 | 92/6/2 | 49 | 35 | Solid uniform coating with slight surface roughness | 10,000 |
| 3 | 90/8/2 | 49 | 40 | Solid uniform coating with slight surface roughness | 1000 |
| 4 | 87.5/10/2.5 | 39 | 40 | Solid uniform coating with slight surface roughness | 1000 |
| 5 | 85/12/3 | 32 | 36 | Solid uniform coating with slight surface roughness | 1000 |
| 6 | 73.75/21/5.25 | 18 | 17 | Solid uniform coating with slight surface roughness | <1000 |

Whereas particular embodiments of the invention have been described hereinabove for purposes of illustration, it will be evident to those skilled in the art that numerous variations of the details of the present invention may be made without departing from the invention as defined in the appended claims.

What is claimed is:

1. A method comprising:
    immersing an electrically conductive substrate into an electrodepositable composition, the substrate serving as an electrode in an electrical circuit comprising the electrode and a counter-electrode immersed in the composition, a coating being applied onto or over at least a portion of the substrate as electric current is passed between the electrodes,
    the electrodepositable composition comprising:
    (a) an aqueous medium;
    (b) an ionic resin; and
    (c) solid particles,
    wherein the composition has a weight ratio of solid particles to ionic resin of at least 17:1; the ionic resin is a water-soluable, base-neutralized carboxylic acid group-containing resin that is a cellulose ether; the solid particles comprising lithium-containing particles and electrically conductive carbon particles in which the weight ratio of lithium-containing particles to electrically conductive carbon particles being at least 3 to 1 and wherein the electrodepositable composition has a total solids content of 1 to 5 percent by weight based on total weight of the composition.

2. The method of claim 1, wherein the substrate is a foil comprising aluminum, iron, copper, manganese, nickel, a combination thereof, and/or an alloy thereof.

3. The method of claim 1, wherein the cellulose ether comprises an alkali salt of a carboxymethylcellulose.

4. The method of claim 3, wherein the carboxymethylcellulose has a weight average molecular weight of 100,000 to 500,000.

5. The method of claim 1, wherein the water soluble resin is present in the composition in an amount of at least 50 percent by weight, based on the total weight of resin in the composition.

6. The method of claim 1, wherein the lithium-containing particles comprise $LiCoO_2$, $LiFePO_4$, $LiCoPO_4$, $LiMnO_2$, $LiMn_2O_4$, $Li(NiMnCo)O_2$, and/or $Li(NiCoAl)O_2$.

7. The method of claim 1, wherein the lithium-containing particles are present in an amount of at least 50 percent by weight, based on the total weight of the solids in the composition.

8. An electrodepositable composition comprising:
    (a) an aqueous medium;
    (b) an ionic resin; and
    (c) solid particles comprising:
        (i) lithium-containing particles, and
        (ii) electrically conductive carbon particles,
    wherein the composition has a weight ratio of solid particles to ionic resin of at least 17:1; the ionic resin is a water-soluable, base-neutralized carboxylic acid group-containing resin that is a cellulose derivative; the weight ratio of lithium-containing particles to electrically conductive carbon particles being at least 3 to 1 and wherein the electrodepositable composition has a total solids content of 1 to 5 percent by weight based on total weight of the composition.

9. The composition of claim 8, wherein the lithium-containing particles comprise $LiCoO_2$, $LiNiO_2$, $LiFePO_4$, $LiCoPO_4$, $LiMnO_2$, $LiMn_2O_4$, $Li(NiMnCo)O_2$, and/or $Li(NiCoAl)O_2$.

10. The composition of claim 8, wherein the lithium-containing particles are present in an amount of at least 50 percent by weight, based on the total weight of the solid particles.

* * * * *